United States Patent [19]

Cesana

[11] Patent Number: 5,819,060
[45] Date of Patent: Oct. 6, 1998

[54] INSTRUCTION SWAPPING IN DUAL PIPELINE MICROPROCESSOR

[75] Inventor: Joseph Cesana, Palo Alto, Calif.

[73] Assignee: LSI Logic Corporation, Milpitas, Calif.

[21] Appl. No.: 728,411

[22] Filed: Oct. 8, 1996

[51] Int. Cl.⁶ .................................................. G06F 9/38
[52] U.S. Cl. ............................................................ 395/395
[58] Field of Search .................. 395/800.23, 800.01, 395/376, 382, 389, 391, 392, 395

[56] References Cited

U.S. PATENT DOCUMENTS

| | | | |
|---|---|---|---|
| 4,447,878 | 5/1984 | Kinnie et al. . | |
| 4,695,943 | 9/1987 | Keely et al. . | |
| 4,961,162 | 10/1990 | Nguyenphu et al. . | |
| 4,991,078 | 2/1991 | Wilhelm et al. . | |
| 5,006,980 | 4/1991 | Sanders et al. | 395/395 |
| 5,315,707 | 5/1994 | Seaman et al. . | |
| 5,386,547 | 1/1995 | Jouppi . | |
| 5,574,937 | 11/1996 | Narain | 395/183.21 |
| 5,592,634 | 1/1997 | Circello et al. | 395/586 |
| 5,634,118 | 5/1997 | Blomgren | 395/567 |

*Primary Examiner*—David Y. Eng
*Attorney, Agent, or Firm*—Townsend and Townsend and Crew LLP; Henry K. Woodward

[57] ABSTRACT

An instruction swap is implemented in a dual pipelined microprocessor to make instruction flow smoother upon resource or structural conflicts in executing an instruction. Instructions are accessed in an even and odd pair with an even instruction proceeding an odd instruction. The accessed instructions are stored in Read/Decode registers for decoding and execution. The even and odd instructions are swapped in the registers and in execution when the preceding even instruction encounters an execution conflict or a branch.

5 Claims, 3 Drawing Sheets

INSTRUCTION SWAPPING IN DUAL PIPELINE MICROPROCESSOR

BACKGROUND OF THE INVENTION

This invention relates generally to a dual pipelined microprocessor in which instructions are accessed in pairs, and more particularly the invention relates to instruction swapping to expedite execution when one instruction encounters a conflict.

Disclosed in co-pending application Ser. No. 08/540,336, filed Oct. 6, 1995, entitled SUPERSCALAR MICROPROCESSOR ARCHITECTURE, now U.S. Pat. No. 5,603,047, is a microprocessor CPU which includes a combination of five independent execution units: ALU, load/store/add unit (LSU), which executes loads and stores as well as add and load immediate instructions, a branch unit, a multiply/shift unit, and a co-processor interface for interfacing with a plurality of co-processor units. A co-processor zero unit (CPO) is the system control processor that supports address translation, exception handling, and other privileged operations. Other customer-defined co-processor units can be added.

All instructions except multiply and divide can be completed in one cycle. Two concurrent pipelines are provided for receiving two instructions per cycle, odd and even. Each pipeline includes a queue (Q) stage between an instruction fetch (IF) and an instruction decode (RD) to boost branch instructions.

The even instruction is followed by the odd instruction in executing a program. However, if the even instruction encounters a resource or structure conflict, the odd instruction can be prevented from executing. This can unnecessarily delay the program execution.

SUMMARY OF THE INVENTION

In accordance with the invention, instruction swapping allows execution of a later instruction when an earlier instruction encounters a conflict.

Assuming an Even bank of instructions and an Odd bank of instructions in which instructions are issued in pairs to Read/Decode (RD) registers with an even instruction preceding an odd instruction, upon encountering a first conflict, the Odd Read instruction is swapped into the even RD register and the even instruction coming out from the even bank is written into the odd RD register. Within the same cycle, the even and odd instructions coming out from the even and odd banks are written into their respective queue registers. From this point on, the flow executes in swap mode though always in order execution. The even bank feeds the odd RD register while the odd queue register forwards its contents into the even RD register.

The flow keeps executing in swap mode until a second resource conflict is detected, in which case it un-swaps and the RD registers receive their respective queue registers as before. The queue then remains active until a non-sequential instruction (branch, jump return from exception) is found in the Queue stage.

The instruction swapping in accordance with the invention provides performance benefits and simplifies the control section of the microprocessor.

The invention and objects and features thereof will be more readily apparent from the following description and appended claims when taken with the drawings.

DESCRIPTION OF THE PREFERRED EMBODIMENT

Figure 1:
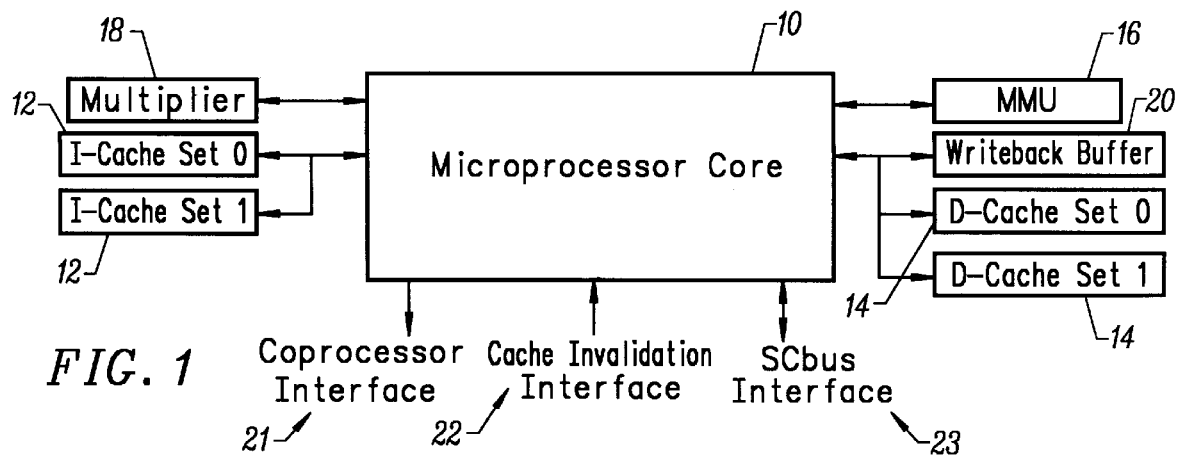
FIG. 1 is an illustration of the microprocessor core with building blocks.

FIG. 1 shows the superscalar microprocessor core which employs instruction swapping in accordance with the invention along with building blocks which interface with the core. The microprocessor has been implemented using the LSI Logic Core Ware system on a chip methodology whereby the core can be integrated into a system on a chip of various configurations. In the illustrated embodiment CPU core 10 is interconnected with a direct mapped or two-way set associative instruction cache 12, direct mapped or two-way associative data cache 14, a memory management unit 16 with 32 entry translation lookaside buffer, a standard multiply unit 18 or a high performance multiply/accumulate unit, and a Write Back buffer 20 for Write Back cache mode. The cache sizes are selectable up to 16k bytes. The options allow a user to develop a self-defined microprocessor. The core has an interface 21 to a coprocessor, and interface 22 to a cache invalidation unit, and an interface 23 to SC bus.

Figure 2:
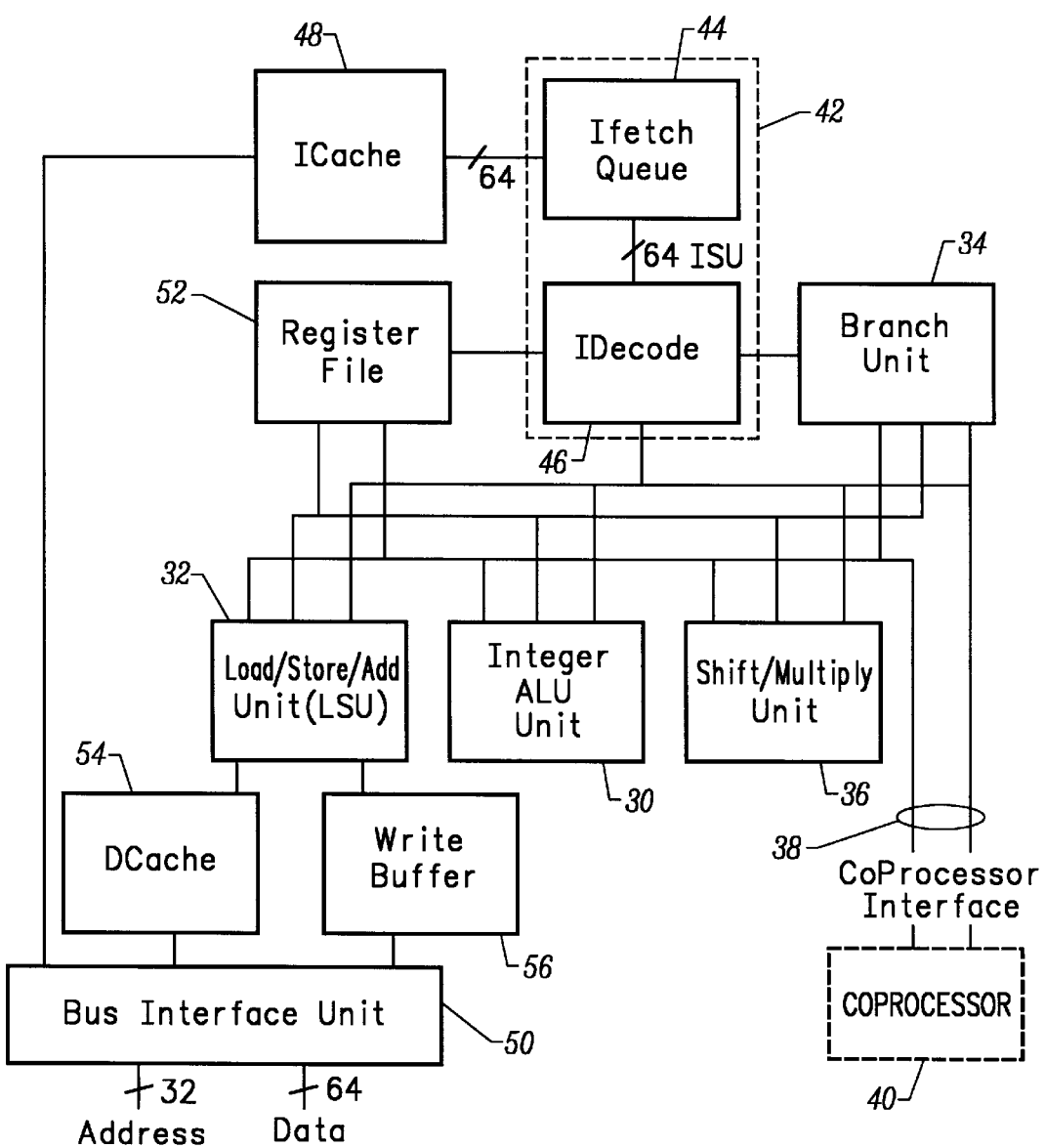
FIG. 2 is a functional block diagram of the CPU core.

FIG. 2 is a functional block diagram of the microprocessor core. The machine can issue and retire two instructions per cycle using a combination of five independent execution units: ALU 30, load/store/add unit (LSU) 32 which executes, loads and stores and can also execute, add and load immediate instructions, branch unit 34, multiply/shift unit 36 and coprocessor interface 38 with a coprocessor 40. The instruction scheduling unit (ISU) 42 includes Ifetch queue (Q) unit 44 and Idecode unit 46. An instruction cache 48 is connected between a bus interface unit 50 and queue stage 44. The bus interface unit 50 manages the flow of instructions and data between the core and the system via the SC bus interface. A register file 52 contains the general purpose registers of the core. It supplies source operands to the execution units and handles the storage of results to target registers. A data cache 54 and write buffer 56 are connected between bus interface unit 50 and LSU unit 32.

Ifetch queue 44 optimizes the supply of instructions to the microprocessor even across breaks in the sequential flow of execution (i.e., jumps and branches). Idecode unit 46 decodes instructions from the Ifetch queue, determines the actions required for the instruction execution, and manages the register file 52, LSU 32, ALU 30, and multiply unit 36 accordingly. Branch unit 34 is used when branch and jump instructions are recognized within the instruction stream.

LSU unit 32 manages loads and stores of data values. Loads come from either the Dcache 54 or the SC bus interface 50 in the event of a Dcache miss. Stores pass directly to the Dcache and to the SC bus interface through the write buffer 56. LSU unit 32 also performs a restricted set or arithmetic operations, including the addition of an immediate offset as required in address calculations. The integer ALU unit 30 calculates the result of an arithmetic or a logic operation, while the multiplier/shift unit 36 performs multiply and divide operations. Thus all three units perform logical, arithmetic, and data movement operations.

Figure 3:
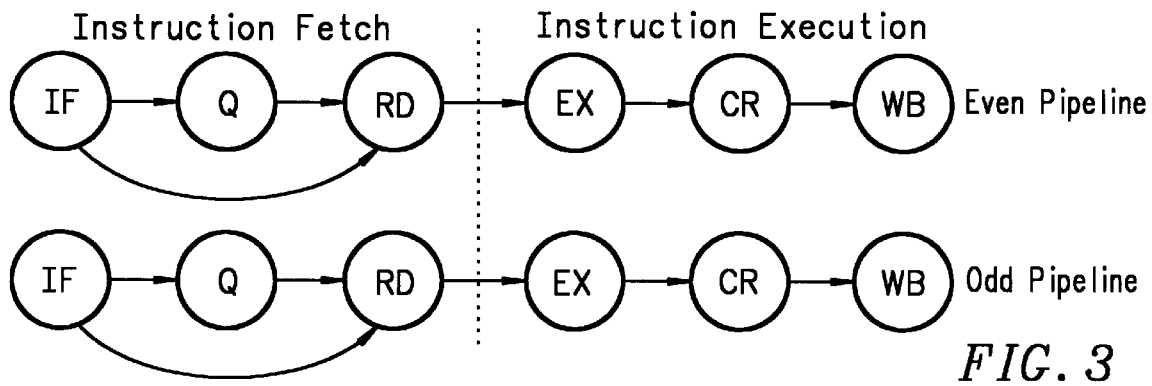
FIG. 3 illustrates the dual pipeline of the CPU.

FIG. 3 illustrates the dual pipeline architecture of the core. The two concurrent pipelines (even and odd) each have six stages. The first three stages comprise the instruction fetch phase and the last three stages comprise the instruction execution phase. In general, the execution of a single instruction consists of the following stages:

1. IF (instruction fetch) fetches the instruction.
2. Q (queuing) provides a conditional stage in which instructions may enter if they deal with branches or register conflicts. An instruction that does not cause a branch or register conflict is fed directly to the RD stage.
3. RD (read) reads any required operands from the register file while the instruction is decoded.
4. EX (execute) executes all instructions. Conditional branches are resolved in this cycle. The address calculation for load and store instructions are performed in this stage.
5. CR (cache read) is used to read the cache for load and store instructions. Data returned to the register bypass logic at the end of this stage.
6. WB (write back) is a register file in which results are written.

Each stage, once it has accepted an instruction from the previous stage, can hold the instruction for reexecution in case of pipeline stalls.

This circuitry is able to fetch and issue two instructions per cycle to the execute stage. Instructions are fetched as double word aligned pairs: slot-0 and slot-1. In the instruction decode stage, there is a two-instruction window. When only slot-0 can be scheduled because slot-1 has a dependency, then the window slides down one instruction. Thus although instructions are always fetched as double word pairs, they are scheduled on single word boundaries. Primary emphasis is placed on execution of branch instructions with minimal penalty. This is the primary function of the queue stage. In general, the queue stage is filled whenever the RD stage has a stall. This can occur fairly often for register conflicts, cache misses, resource conflicts, and the like. Filling the queue stage in this case allows the IF stage to work ahead one cycle.

Once an instruction pair has been allowed to pass into the RD stage, it is decoded and at the same time the register source addresses are passed to the register file for reading operands. Register dependencies and resource dependencies are checked in this stage. If the instruction in slot-0 has no dependency on a register or resource currently tied up by previous instruction, then it will be passed immediately into the EX stage where it forks to the appropriate execution unit. The instruction in slot-1 may also be dependent on a resource or register in slot-0, so it must be checked for dependencies against both slot-0 and any previous not retired instruction. If either instruction must be held in the RD stage, then if the queue stage is not full, the IF stage will be allowed to continue in order to fill the queue stage. If the queue stage is full, then the queue and IF stages will be frozen or stalled. Register bypass opportunities are considered in the RD stage, and the bypass multiplexors control signals are set for potential bypass cases from a previous instruction which is still in the pipeline. For instruction execution, the pair of instructions or a single instruction when there was a previous block, are individually passed to the independent execution units. Each execution unit receives operands from the register bypass logic and an instruction from the instruction scheduler. Each instruction spins one run cycle in an execution unit. In the case of ALU and other single cycle instructions, the result is then fed to the register/bypass unit for the CR stage.

Figure 4:
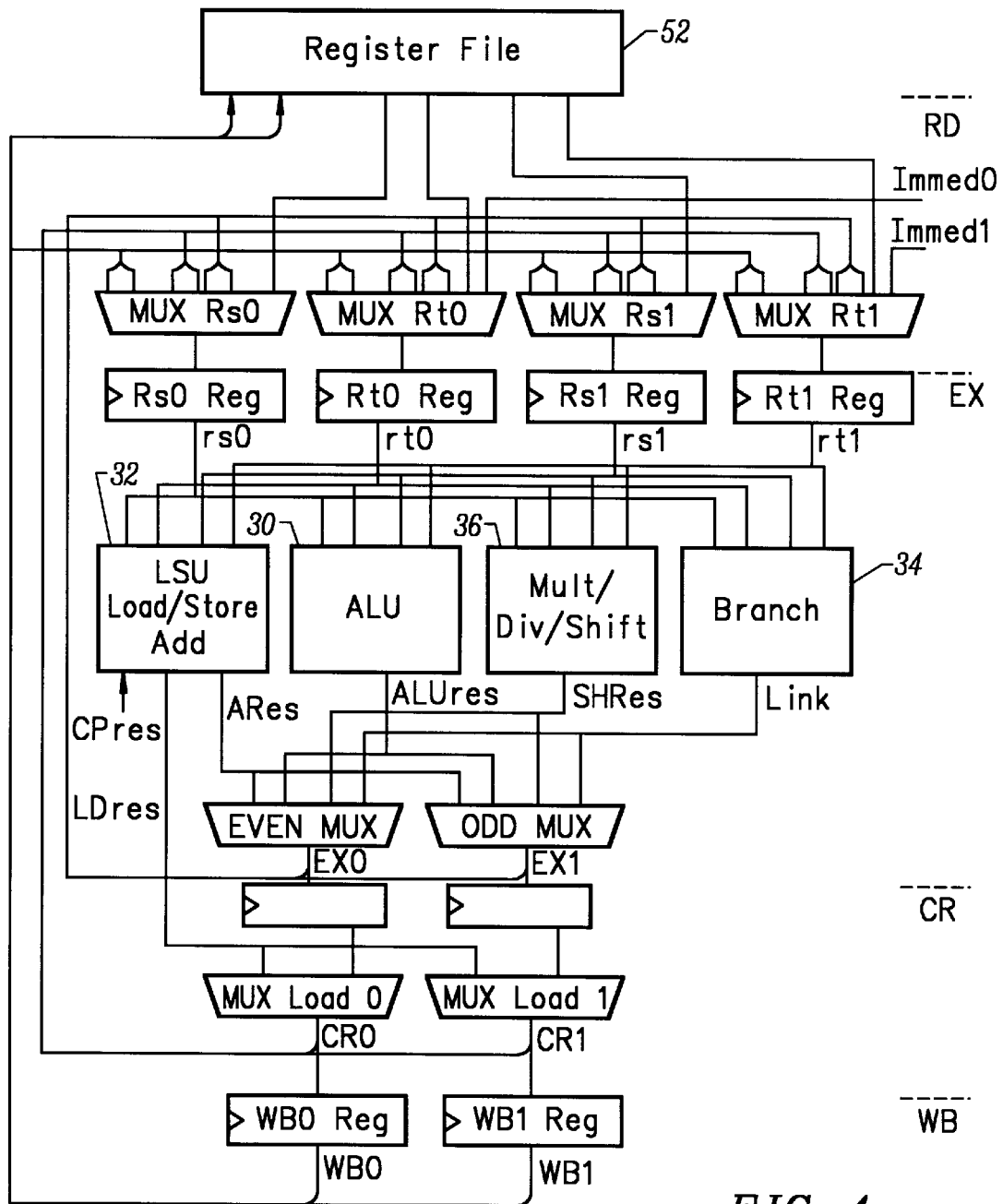
FIG. 4 is a schematic of the data path of the CPU.

FIG. 4 is a schematic of the CPU data path with various stages of the pipeline labeled to visualize the instruction execution flow. The data path is organized around different blocks. All instructions are issued at the RD stage under the control of an instruction scheduling unit. The architecture of the data path balances the ability of executing a dual instruction per cycle and the underlying complexity essentially due to the execution units.

Most of the instructions execute in a single cycle at the EX stage except for the divide, multiply, and derivative instructions. For theses instructions, once their opcodes are decoded at the RD stage, these successive operations are controlled internally to the ALU and the ISU is informed that the associated unit is busy.

Figure 5:
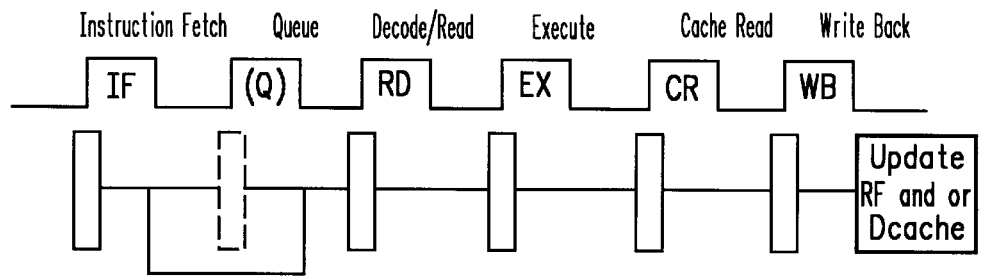
FIG. 5 illustrates the pipeline stages and registers therein.

As illustrated in FIG. 5, each stage of the pipeline is isolated by a set of registers, the concept here is to observe a synchronous flow of data with respect of the 80 MHz clock target.

At the IF stage, the instruction cache virtually addressed, provides an instruction pair per cycle.

The Queue can be active or inactive. When active, it receives the next sequential instruction pair and a virtual address. This concept of an optional queue handles efficiently the multiple cases for the branch instructions and minimizes the number of cycles in order to resolve a resource conflict. When it is inactive, the queue is bypassed and subsequent instruction pairs are directly written at the RD stage.

When the instructions reach their RD stage, their opcode fields are decoded and associated operands are fetched from the register file. In some instances, the register file is bypassed during its read cycle and the source operand registers are fed with the results from the subsequent stages. Under optimal conditions, the register file is accessed both on its four read ports and two write ports.

Instructions are said to be issued when they enter their EX stage. As illustrated in FIG. 4, the execution stage is made around four blocks divided into two main units. When a memory class instruction is decoded at the RD stage, the LSU unit takes over full responsibility for the following steps. All other instruction classes are handled within the ALU unit. To increase the frequency of a dual instruction per cycle, the Lsu unit can, in some instances, execute an Add(i) instruction concurrently with an arithmetic instruction. Upon such a case, the Lsu is active in its EX stage and the following stages remain inactive.

At CR stage, the result of an arithmetic instruction is simple forwarded to its next stage. A Store or a Load instruction both read the tag contents and compare their indexed entries with the CPO incoming translated physical page number. A Load instruction also reads the indexed data cache contents.

For all R-type instructions, results are written into the register file during the WB stage. For a Store instruction, data cache is updated during this stage.

Figure 6:
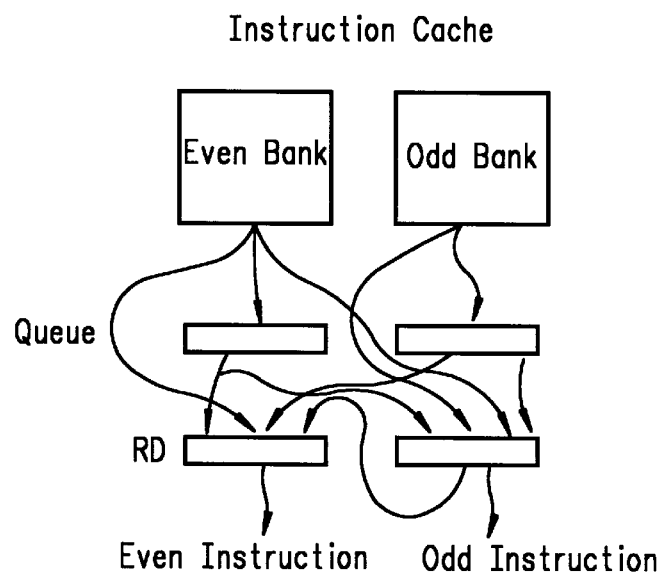
FIG. 6 illustrates instruction swapping in accordance with the invention.

The simplified block diagram of FIG. 6 visualizes the implementation that will allow the instruction flow swapping in accordance with the invention. It is assumed in this diagram that a direct map instruction cache configuration, both banks provide a 32 bit instruction. The even instruction is followed by the odd instruction when executing the program.

In normal mode, the queue is bypassed and the instructions from caches are directly written into their respective Even and Odd Rd registers.

Upon the first conflict, the Odd RD instruction is swapped into the even RD register and the even instruction coming out from the even bank is written into the odd RD register. Within the same cycle, the even and odd instructions coming out from the even and odd banks are written into their respective queue registers. From this point on, the flow executes in swap mode though always in order execution. The even bank feeds the odd RD register while the odd queue register forwards its contents into the even RD register.

The flow keeps executing in swap mode until a second resource conflict is detected, in which case it un-swaps and the RD registers receive their respective queue registers as before. The queue then remains active until a non-sequential instruction (branch, jump return from exception) is found in the Queue stage.

Figure 7:
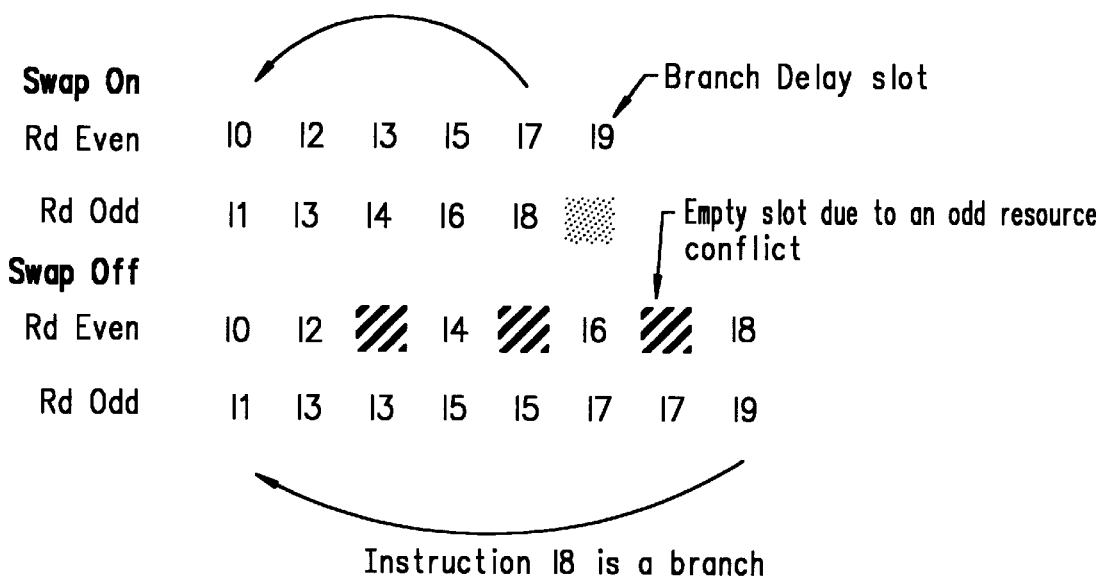
FIG. 7 illustrates the benefit of instruction swapping.

The benefit obtained by swapping the instruction flow is to be compared against the same architecture without swapping. The diagram in FIG. 7 visualizes the case where swapping resolves later resource conflicts and what would be the underlying gain in terms of cycles won.

Both cases run 10 instructions within a loop iteration, we observe that each resource conflict due to the fact that the instruction flow is not swapped adds one slot penalty in the process of executing the instructions.

The number of cycles saved is illustrated by the following formula:

$$p[(n+1)-k]/2 \tag{1}$$

where:
- n is the number of odd resource conflicts saved when swapping,
- k is the number of Odd resource conflicts due to the swap,
- p is the loop iteration number where 18 branch instruction is taken.

In addition of the performance benefits the control section is significantly simplified since the instruction flow does not need to be interrupted when the odd resource conflicts occur.

There has been described a dual pipeline microprocessor in which instruction swapping enhances performance when an instruction conflict is encountered. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A dual pipelined microprocessor comprising
   an even bank of instructions and an odd bank of instructions,
   means for accessing instructions in pairs from said even bank and said odd bank with an even bank instruction preceding an odd bank instruction,
   odd and even read/decode registers for storing the accessed instructions,
   an execution stage for executing each instruction,
   odd and even queue registers preceding said read registers for storing instructions upon encountering an instruction execution conflict, and
   means for swapping instructions in said queue registers and in said read/decode registers to permit execution of a following instruction when a preceding instruction execution conflict is encountered.

2. In a dual pipelined microprocessor, an instruction fetch and read apparatus comprising
   an even bank of instructions and an odd bank of instructions,
   even and odd read/decode registers for storing instructions accessed in pairs, and
   means for swapping instructions in said even and odd read/decode registers to permit execution of a following instruction when a preceding instruction execution conflict is encountered.

3. The instruction fetch and read apparatus as defined by claim 2 and further including even and odd queue registers preceding said read registers for storing instructions upon encountering an instruction execution conflict.

4. A method of instruction execution in a dual pipelined microprocessor comprising the steps of:
   accessing instructions in an even and odd pairs with an even instruction preceding an odd instruction,
   storing accessed instructions in even and odd instruction read/decode registers, and
   swapping said accessed instructions in said read registers to permit execution of a following instruction when a preceding instruction execution conflict is encountered.

5. The method as defined by claim 4 and further including the steps of storing instructions in queue registers when instruction execution conflict is encountered, and
   swapping instruction from said queue registers when loading said read/decode registers.

* * * * *